US008898759B2

(12) United States Patent
Schultz et al.

(10) Patent No.: US 8,898,759 B2
(45) Date of Patent: Nov. 25, 2014

(54) APPLICATION REGISTRATION, AUTHORIZATION, AND VERIFICATION

(75) Inventors: Paul T. Schultz, Colorado Springs, CO (US); Mark J. Hahn, Stow, MA (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1049 days.

(21) Appl. No.: 12/861,981

(22) Filed: Aug. 24, 2010

(65) Prior Publication Data

US 2012/0054841 A1 Mar. 1, 2012

(51) Int. Cl.
G06F 7/24 (2006.01)
G06F 15/16 (2006.01)
G06F 17/30 (2006.01)
H04L 29/06 (2006.01)

(52) U.S. Cl.
USPC ........ 726/6; 709/203; 726/9; 726/17; 726/18; 726/19

(58) Field of Classification Search
CPC ......... G06F 21/33; H04L 9/3213; H04L 9/32; H04L 63/12
USPC ............................................................ 726/6
See application file for complete search history.

(56) References Cited

U.S. PATENT DOCUMENTS

| 6,771,605 | B1 * | 8/2004 | Law et al. ..................... 370/242 |
| 6,892,307 | B1 | 5/2005 | Wood et al. |
| 7,711,117 | B1 | 5/2010 | Rohrle et al. |
| 2004/0029576 | A1 * | 2/2004 | Flykt et al. .................. 455/422.1 |
| 2004/0128546 | A1 | 7/2004 | Blakley et al. |
| 2005/0108551 | A1 | 5/2005 | Toomey |
| 2008/0066175 | A1 | 3/2008 | Dillaway et al. |
| 2009/0055398 | A1 * | 2/2009 | Zhu et al. ........................ 707/10 |
| 2010/0125732 | A1 | 5/2010 | Cha et al. |
| 2010/0199332 | A1 | 8/2010 | Bachmann et al. |
| 2011/0078229 | A1 * | 3/2011 | Qiu et al. ...................... 709/203 |
| 2011/0179477 | A1 | 7/2011 | Starnes et al. |

FOREIGN PATENT DOCUMENTS

EP 2007097 12/2008

* cited by examiner

*Primary Examiner* — Arvin Eskandarnia

(57) ABSTRACT

A system that includes a memory to store registration information for a particular application hosted by a particular user device, where the registration information includes context information regarding the particular user device and an integrity code based on credentials associated with the particular application. The system also includes a first server to receive, from a second server, a request to receive a service on behalf of a user device that hosts an application, the request including other credentials associated with the application; generate, using a data integrity algorithm, another integrity code based on the other credentials; determine that the application is trusted when the integrity code matches the other integrity code; compare other context information associated with the user device with the context information when the application is trusted; and send an instruction to the user device to re-register the application when the context information does not match the other context information.

20 Claims, 7 Drawing Sheets

| | Device Identifier 502 | Application Identifier 504 | Username 506 | Password 508 | Personal Identification Number 510 | Location 512 | Other Context 514 | Network Access Point 516 | Integrity Code 518 | Registration Number 520 |
|---|---|---|---|---|---|---|---|---|---|---|
| 522 | IMSI/MSISDN MDN | Application 1 | rjones | orange | 1234 | Locations A, B | Device Capabilities | APN 1 / PDN 1 | 389782 | 132435 |
| 524 | NAI/IMSI/MDN | Application 2 | Rob Jones | blue | 4321 | Locations C, D | device Capabilities | | 9867230 | 234654 |
| 526 | MAC Address / IP Address | Application 2 | Robert Jones | maroon | 2345 | Location D | 3rd Party Application ID | Gateway N | 867326 | 918273 |
| 528 | CODEC / STB ID | Application N | rjones | black | 9876 | Location D | Time of Day | APN 2 | 478291 | 564738 |

APPLICATION REGISTRATION, AUTHORIZATION, AND VERIFICATION

BACKGROUND

Today's user devices are capable of using applications that provide an ever-increasing variety of services that continue to improve the user's experience. Many of today's applications can be downloaded to a user device and can be used to communicate with other applications (e.g., service provider applications, third party applications, etc.) hosted by service provider networks and/or other networks (e.g., the Internet).

Sometimes it is difficult, however, to verify the source and/or trustworthiness of an application that is downloaded to and/or hosted by a user device. For example, a user device might download an application, from a nefarious source, that introduces a virus into the user device or that enables a third party to access information stored on the user device without consent from a user of the user device. In another example, a service provider network may interact with a user device-hosted application that introduces a virus into the service provider network or which enables unauthorized access, by a third party, to information associated with the service provider network. It is also difficult to determine whether a legitimate user device-hosted application (e.g., an application from a trusted source that has been authorized for use by a particular user device) is being used by another user device (e.g., an imposter user device) without the knowledge or authorization of a user of the user device or of the trusted source.

BRIEF DESCRIPTION OF THE DRAWINGS

FIG. 5 is a diagram of an example user device-hosted application identity data structure;

DETAILED DESCRIPTION OF PREFERRED EMBODIMENTS

Figure 1:
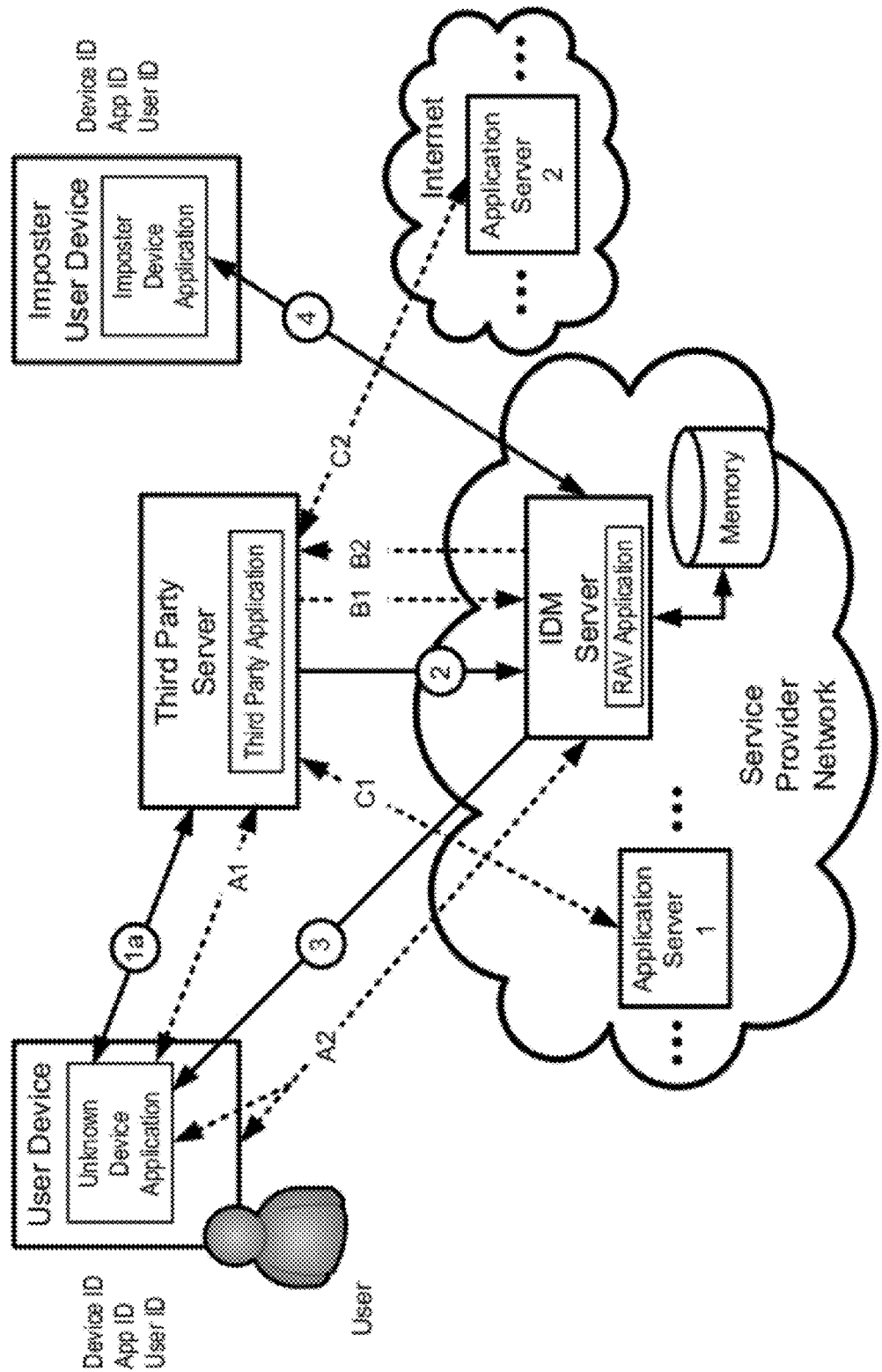
FIG. 1 is a diagram that illustrates an overview of an application registration, authorization, and verification implementation described herein.

The following detailed description refers to the accompanying drawings. The same reference numbers in different drawings may identify the same or similar elements. Also, the following detailed description does not limit the invention.

An implementation described herein may include systems and/or methods that provide for application registration, authorization and verification of a user device-hosted application (hereinafter referred to as a "device application"). As described herein, the application registration, authorization, and verification implementation may use a registration, authorization, and verification application (hereinafter referred to as a "RAV application") to perform an operation to identify and/or register a device application. As also described herein, the RAV application may provide authorization and/or verification services for a user device, a service provider network, and/or a third party application (e.g., on behalf of a user of a user device) to authorize and/or to verify a device application and/or a user device that hosts the device application.

The application registration, authorization and verification implementation may protect a user device, a service provider network, and/or a third party application from acts performed by another user device and/or another device application (hereinafter referred to as an "imposter user device" and/or an "imposter device application," respectively) attempting to receive services using credentials associated with a trusted device application (e.g., a device application that has been verified), a user device on which the trusted application is hosted, and/or a user of the user device. The application registration, authorization and verification implementation may also protect a user device, a service provider network, and/or a third party application from acts performed by a device application that is not a trusted application, such as cyber attacks (e.g., unauthorized penetration of a user device and/or network, a denial of service attack, etc.), introducing viruses, worms, etc. into a network, an unauthorized disclosure of user information and/or network content, etc. As described herein, the RAV application may perform a registration operation, a verification operation, or an authorization operation or a combination of two or more of the registration operation, verification operation, and/or the authorization operations.

The term, "third party application," as described herein, may be an application that is hosted by a server device associated with a particular network (e.g., the Internet) that is different than a network with which the RAV application is associated and/or which may communicate with other networks to obtain services on behalf of a user device.

In one example implementation, an RAV application may perform an operation to register a device application hosted by a user device. For example, the RAV application may receive a request to register a device application from a user device and/or from a third party application (e.g., on behalf of the user device). The RAV application may receive the request and may register the device application based on a determination that the device application is a trusted application or originates from a trusted source (e.g., a vendor that produced the device application that has been verified).

In another example implementation, the RAV application may perform verification operations on a device application hosted by a user device. For example, the RAV application may verify that the device application is a trusted application by determining that the application is from a trusted source and/or includes a particular application identifier and/or application signature that identifies the application as a trusted application. In another example, the RAV application may verify that the device application is being used by an authorized user of a user device and/or is being hosted by an authorized user device.

In yet another example implementation, the RAV application may perform authorization operations on a device application and/or a user device that hosts the device application. For example, the RAV application may authorize the device application by determining that context information, associated with a user device, matches context information obtained from prior sessions with the user device using the device application. The context information may include location information associated with a user device, network access information, user device capabilities, user habits, transaction history, etc.

FIG. 1 is a diagram that illustrates an overview of an application registration, authorization, and verification implementation described herein. As illustrated in FIG. 1, a third party server may host a third party application (e.g., "Personal Assistant"—not shown in FIG. 1) that may provide a service to a user associated with a user device. The third party application may interact with a device application (e.g., shown as unknown device application), hosted by the user device, that is unknown to a RAV application hosted by an identity management server (e.g., shown as IDM server). The third party server may, for example, host the third party application to provide services (e.g., a personal assistant service) to the user device, via the unknown device application, based on services obtained from service provider applications (e.g., a calendar service application, a location service application, a mapping service application, etc.) hosted by application servers (e.g., application servers 1, 2, etc.).

Assume that the user, of the user device, uses a device application (e.g., the unknown device application) to communicate with a third party application (e.g., hosted by the third party server) to receive services, purchase goods, etc. Assume further that the third party application desires to access an application server (e.g., application server 1, application server 2, and/or other application servers) to obtain services on behalf of the user device.

As shown in FIG. 1, for example, the user device may use a device application (e.g., unknown device application) to log into the third party server in order to receive services by sending, as indication A1, a token to the third party application. The token may include credentials, such as a user device identifier, information associated with the user, and/or information associated with the unknown device application (e.g., an application identifier, an application signature, a vendor identifier, etc.). In another example, the user may provide the credentials by entering the credentials via a keypad/keyboard, a touch screen, a biometric device, and/or some other device associated with the user device. The biometric device may include a device (e.g., a camera, a laser scanner, a microphone, etc.) that may receive biometric information associated with an unknown user (e.g., a retina scan, a voice signature, a facial signature, fingerprint, etc.).

As also shown in FIG. 1, the RAV application may receive a request from a third party application to register an unknown device application hosted by the user device. For example, the third party application may send, as indication B1, a request (e.g., that may include the token), to register the unknown device application, that includes all or a portion of the credentials, received from the unknown device application, to the IDM server.

Additionally, or alternatively, the RAV application may authenticate the user device using the user device identifier and/or information associated with the user. If the RAV application is able to authenticate the third party application and/or the user device, then the RAV application may perform an operation to register the unknown device application using the information associated with the device application. For example, the RAV application may perform a look up operation to determine whether the device application is a trusted application. The RAV application may, for example, determine whether the information associated with the device application matches any information associated with trusted applications stored in a memory. Based on the determination that the unknown device application is a trusted device application, the RAV application may register the unknown device application and may use a data integrity algorithm, such as a cryptographic algorithm, a hashing algorithm, a checksum, or some other mathematical algorithm to generate an integrity code. The integrity code may be based on the login credentials received in the token (e.g., the user device identifier, the application identifier, the information associated with the user, etc.) and/or obtained from the user and/or the user device.

In another example, the RAV application may obtain context information associated with the user device. The context information may include location information associated with the user device, network access, and/or connection information (e.g., an access point network (APN), a packet data network (PDN), a gateway identifier, gateway port information, etc.), information associated with user device type, capabilities and/or configuration, transaction history, etc. In one example, the RAV application may generate a data integrity code based on the context information. In another example, the RAV application may generate a data integrity code based on the credentials and the context information.

The RAV application may send, as indication B2, information confirming the registration of the unknown device application and/or may store, as registration information, the credentials, the context information, and/or the integrity code(s). The third party application may receive the information confirming the registration of the unknown device. In another example, the RAV application may send a registration token that is valid for a period of time after which the unknown device application is to be re-registered. In yet another example, the registration operation may be initiated directly with the RAV application, as indication A2, by the user device and/or the unknown device application.

As also shown in FIG. 1, the RAV application may perform operations to verify a user device and/or an unknown device application hosted on the user device. In one example, the user may desire to receive services via a third party application and may use the unknown device application to send, to the third party server, as indication 1a, a token that includes credentials and/or is a registration token. The third party application may forward the login credentials and/or the registration token, as indication 2, to the RAV application.

In one example, the RAV application may verify the unknown device application using the registration token. In another example, the RAV application may use the login credentials obtained from the token (e.g., a device identifier, an application identifier, information associated with the user, etc.) to determine whether to verify the unknown application and/or the user device. The RAV application may, for example, verify the unknown device application by using a data integrity algorithm, such as a hash algorithm, a cryptographic algorithm, a checksum algorithm, and/or some other mathematical algorithm to generate an integrity code based on the login credentials. The RAV application may compare the generated integrity code to an integrity code, associated with the user device, stored in a memory to determine whether to verify the unknown device application and/or the user device.

In yet another example, the RAV application may query the user device, shown as indication 3, to obtain context information (e.g., location information, device capabilities, network access and/or connection information, etc.) associated with the user device. The RAV application may determine that the context information matches context information associated with the user device, obtained at a prior point in time, stored in a memory and may verify the unknown device application. In another example, the RAV application may generate an integrity code, based on the context information. The RAV application may, for example, compare the generated integrity code to an integrity code, associated with the user device, stored in a memory to determine whether to verify the unknown device application and/or the user device.

If the RAV application is not able to verify the unknown device application and/or user device, then the RAV application may determine that the unknown device application is potentially an imposter device application and/or that the user device is potentially an imposter user device. In this example, the RAV application may send, as indication 4, an instruction to the imposter application to re-register with the RAV application in a manner similar to that described above.

As further shown in FIG. 1, the RAV application may perform operations to authorize an unknown device application hosted on the user device. In the case where the RAV application verifies the unknown application and/or the user device, the RAV application may query a memory that stores network policies that govern whether and/or the manner in which services can be obtained from a service provider application (e.g., hosted by application server 1 and/or application server 2). In another example, the RAV application may query a memory that stores permissions associated with whether and/or the manner in which a user (e.g., of another user device) authorizes information, associated with the other user device, to be obtained by the service provider application. Based on the determination that the unknown device application is a trusted application (e.g., via the verification process) and that rendering services to the unknown device application are authorized, the RAV application may send login credentials to the third party application, which may be used (e.g., as shown by indications C1 and C2) to obtain services from application servers 1, 2, etc.

Figure 2:
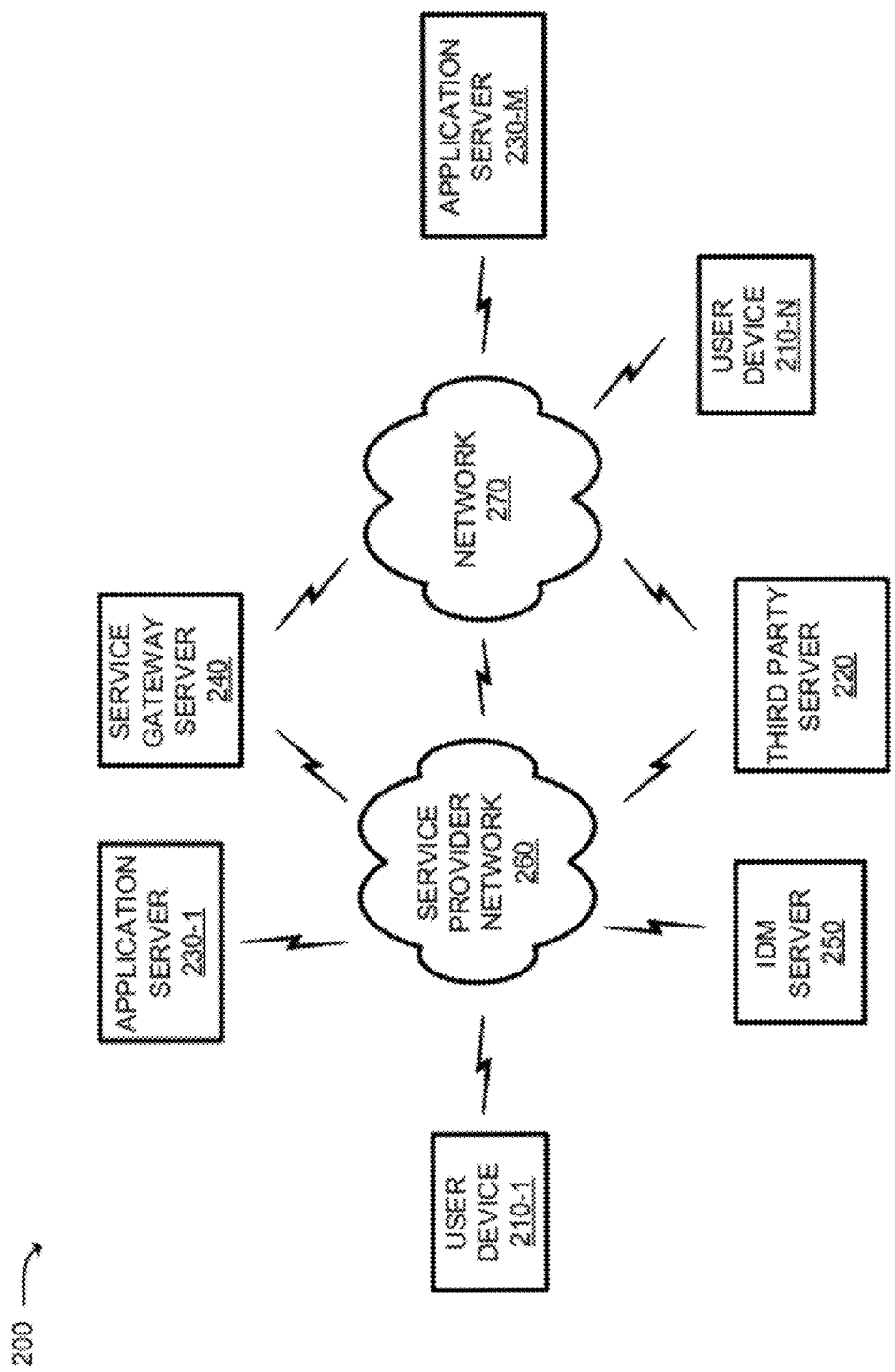
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include a group of user devices 210-1, . . . , 210-N (N≥1) (hereinafter referred to collectively as "user devices 210" and individually as a "user device 210"), a third party server 220, a group of application servers 230-1, . . . 230-M (M≥1) (hereinafter referred to collectively as "application servers 230" and individually as an "application server 230"), a service gateway server 240, an IDM server 250, a service provider network 260, and a network 270. The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2.

Also, in some implementations, one or more of the devices of network 200 may perform one or more functions described as being performed by another one or more of the devices of network 200. Devices of network 200 may interconnect via wired connections, wireless connections, or a combination of wired and wireless connections.

User device 210 may include any computation or communication device that is capable of communicating via service provider network 260 and/or network 270. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a landline telephone, a laptop computer, a tablet computer, a personal computer, a set top box (STB), a television, a camera, a personal gaming system, or another type of computation or communication device. The description to follow will generally refer to user device 210 as a wireless mobile device. The description is not limited, however, to a wireless mobile device and may equally apply to other types of user devices.

User device 210-1 may host a device application that may be used to obtain services from a service provider application (e.g., hosted by application server 230) and/or a third party application (e.g., hosted by third party server 220). For example, user device 210-1 may send a request to third party server 220 (e.g., to receive services from the third party application) that includes login credentials as described above with respect to FIG. 1 (e.g., via a token, a keyboard/keypad, a speech recognition device, and/or some other device associated with user device 210-1). User device 210-1 may communicate with the third party application to receive and/or utilized services.

User device 210-N may be an imposter device and/or may host an imposter device application that enables user device 210-N to use, in an unauthorized manner, login credentials associated with a user of user device 210-1, user device 210-1, and/or a device application hosted by user device 210-1. For example, user device 210-N may communicate with third party server 220 to obtain services from a third party application that is hosted by third party server 220. User device 210-N may, for example, send a request to third party server 220 (e.g., to receive services from the third party application) that includes login credentials as described above with respect to FIG. 1 (e.g., via a token, a keyboard/keypad, a speech recognition device, and/or some other device associated with user device 210-N). User device 210-N may communicate with the third party application to receive and/or utilize services.

Third party server 220 may include one or more server devices, or other types of computation or communication devices, that gather, process, search, store, and/or provide information in a manner similar to that described herein. For example, third party server 220 may include a server device that hosts a third party application that provides services to user device 210. For example, the third party application may obtain services from service provider applications (e.g., hosted by application servers 230), and/or may present the services to user device 210.

Third party server 220 may communicate with IDM server 250 to obtain registration, verification, and/or authorization services. For example, third party server 220 may send a token and/or login credentials (e.g., received from user device 210), contained in the token, to IDM server 250 to register user device 210 and/or an unknown device application hosted by user device 210. In another example, third party server 220 may send a token and/or login credentials to IDM server 250 to verify an unknown device application, user device 210, and/or a user of user device 210. Third party server 220 may receive, from IDM server 250, other login credentials for service provider applications and may send the other login credentials, on behalf of user device 210, to application servers 230 to obtain services to be provided to user device 210.

Application server 230 may include one or more server devices, or other types of computation or communication devices, that gather, process, search, store, and/or provide information in a manner similar to that described herein. For example, application server 230 may host a service provider application that provides a service that may be used by user device 210 and/or a third party application associated with third party server 220. In one example, application server 230 may, in response to a request for services from a third party application, perform an operation to authenticate an unknown user and/or user device 210 and may provide a service to third party server 220 based on the authentication operation. In another example, application server 230 may receive the request and may query IDM server 250 to verify user device 210 and/or an unknown device application hosted by user device 210. The query may be sent, for example, when a service provider application, hosted by application server 230, provides a service that uses information of a sensitive nature (e.g., privacy information associated with a user of another user device 210, billing information, electronic medical record information, etc.).

Service gateway server 240 may include one or more server devices, or other types of computation or communication devices, that gather, process, search, store, and/or provide information in a manner similar to that described herein. For example, service gateway server 240 may receive a request for services from a third party application (e.g., hosted by third party server 220) and may communicate with application server 230-1 to obtain information and/or services from a service provider application associated with user device 210. Service gateway server 240 may, for example, send the received information and/or services to a third party application (e.g., hosted by third party server 220) and/or to a service provider application (e.g., hosted by application server 230) based on an authorization by IDM server 250 and/or when authenticated by service gateway server 240.

IDM server 250 may include one or more server devices, or other types of computation or communication devices, that gather, process, search, store, and/or provide information in a manner similar to that described herein. For example, IDM server 250 may host a RAV application that performs a registration, verification, and/or authorization operation associated with an unknown device application hosted by user device 210. In one example, IDM server 250 may receive a request to register an unknown device application. The request may include registration credentials, such as information associated with the unknown device application (e.g., an application identifier, an application signature, an application name, an application vendor, etc.); information associated with a user of user device 210 (e.g., a username, a password, a personal identification number (PIN), etc.); and/or information associated with user device 210 (e.g., a device identifier, such as a mobile directory number (MDN), a landline directory number (LDN), an international mobile subscriber identity (IMSI), an international mobile equipment identity (IMEI), an electronic serial number (ESN), a universal integrated circuit card (UICC) identifier, a mobile identification number (MIN), a mobile subscriber integrated services digital network (MSISDN) number, a national access identifier (NAI), a media access control (MAC) address, an IP address, a uniform resource locator (URL), an encoder-decoder (CODEC) number, a STB identifier, etc).

The RAV application may use the information associated with the user and/or device identifier received in the request to authenticate user device 210 and may use the information associated with the application to determine whether the unknown device application is a trusted application and/or originates from a trusted source. Based on the authentication and a determination that the unknown device application is a trusted application, the RAV application may use a data integrity algorithm, such as a hash algorithm (e.g., based on hash functions by Bernstein, Zobrist, Jenkins, etc.) a cryptographic algorithm (e.g., based on cryptographic hash functions, such as Secure Hash Algorithm (SHA), etc.), a checksum algorithm, and/or another mathematical algorithm to generate a unique integrity code based on the registration credentials that may be used to verify and/or authorize the unknown device application, the user, and/or the user device at a later point in time.

In another example, the RAV application, hosted by IDM server 250, may verify an unknown device application and/or user device 210 to ensure that the unknown device application originates from a trusted source and/or is associated with an authorized user device 210. Additionally, or alternatively, the RAV application may, for example, perform other verification operations based on context information associated with user device 210 that hosts a verified/registered device application. In this example, the RAV application may send a query to user device 210 to obtain context information, such as location information, network access information (e.g., an access network point (APN), a packet data network (PDN), a gateway identifier, port information, etc.), user device 210 capabilities information (e.g., user device type, model, etc.), etc.

In yet another example, the RAV application may authorize user device 210 that hosts a verified/registered device application based on policy information associated with service provider network 260 and/or permission information associated with a user of another user device 210. IDM server 250 may, for example, retrieve policy information, associated with service provider network 260, from a memory (e.g., a memory associated with IDM server 250) to determine whether the policy information permits IDM server 250 to send login credentials to third party server 220 that enables the third party application to access a service provider application (e.g., hosted by application servers 230). Additionally, or alternatively, IDM server 250 may determine whether and/or under what conditions a user, of another user device 210 from which the service provider application obtains information, authorizes the release of information to third party server 220.

Based on a determination that the unknown device application and/or the user device that hosts the unknown device application can be verified and/or authorized, the RAV application may send login credentials that permit a third party application to access application server 230, on behalf of the user of user device 210. However, if the RAV application determines that the unknown device application and/or user device 210 that hosts the unknown device application cannot be verified and/or authorized, then the RAV application may instruct user device 210 to re-register the unknown device application.

Service provider network 260 may include one or more wired and/or wireless networks via which application registration, verification, and/or authorization services are provided. For example, service provider network 260 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 260 may include a wide area network (WAN), a metropolitan area network (MAN), an ad hoc network, an intranet, a fiber optic-based network (e.g., a fiber optic service (FiOS) network), and/or a combination of these or other types of networks.

Network 270 may include one or more wired and/or wireless networks. For example, network 270 may include a cellular network, the PLMN, a 2G network, a 3G network, a 4G network (e.g., an LTE network), a 5G network, and/or another network. Additionally, or alternatively, network 270 may include a WAN, a MAN, a telephone network (e.g., the Public Switched Telephone Network (PSTN)), an ad hoc network, an intranet, the Internet, a fiber optic-based network (e.g., a FiOS network), and/or a combination of these or other types of networks.

Figure 3:
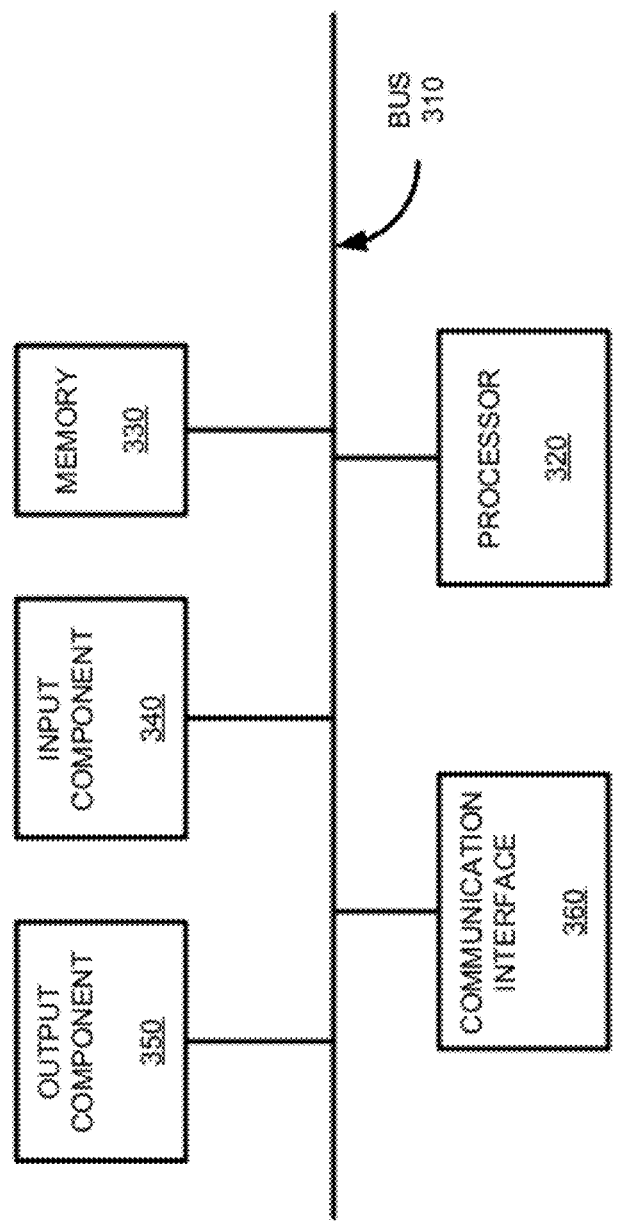
FIG. 3 is a diagram of example components of one or more of the devices of FIG. 2.

FIG. 3 is a diagram of example components of a device 300. Device 300 may correspond to user device 210, third party server 220, application server 230, service gateway server 240, and/or IDM server 250. Alternatively, each of user device 210, third party server 220, application server 230, service gateway server 240, and/or IDM server 250 may include multiple devices 300.

Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, a microphone, a camera, a fingerprint reader, etc. Output component 350 may include a mechanism that outputs information to the user, such as a display, a speaker, one or more light emitting diodes (LEDs), a haptics-based device, etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 260 and/or network 270.

As will be described in detail below, device 300 may perform certain operations relating to application registration, verification, and/or authorization. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
FIG. 4 is a flowchart of an example process for registering a user device-hosted application.

FIG. 4 is a flowchart of an example process 400 for registering a device application. In one implementation, process 400 may be performed by IDM server 250. In another implementation, some or all of process 400 may be performed by a device or collection of devices separate from, or in combination with, IDM server 250. For example, service gateway server 240 and/or IDM server 250 could be combined into a single device that performs process 400.

As shown in FIG. 4, process 400 may include receiving a request to register a device application from a third party application (block 405). For example, a user (e.g., of user device 210) may desire to use a device application hosted by user device 210 to receive services from a third party application hosted by third party server 220. The user may use the device application to send a request for services, to third party server 220, that may include credentials that permit the third party application to obtain services, on behalf of user device 210, from a service provider application hosted on application server 230. In another example, the request may include a token that includes the credentials and/or other information. In a manner similar to that described above with respect to FIG. 2, the credentials may include an identifier associated with the device application (e.g., an application identifier, an application signature, a vendor identifier, etc.), information associated with user device 210 (e.g., a device identifier, a MAC address, an MDN, an IP address, etc.), and/or information associated with the user (e.g., username, password, PIN, etc.). The third party application may receive the request (e.g., via the token) and may send the request, as a registration request, to IDM server 250.

For example, IDM server 250 may receive the registration request, from third party server 220, to register a device application with the RAV application hosted on IDM server 250. The registration request may be in the form of the token, include the credentials received from the device application hosted by user device 210, and/or include other information (e.g., information associated with the third party application and/or third party server 220).

In another example implementation, IDM server 250 may receive the registration request directly from the device application hosted by user device 210. In this example, the device application may send the registration request to IDM server 250 that may be in the form of the token and/or include the credentials as described above.

As also shown in FIG. 4, process 400 may include authenticating the third party application based on information associated with the third party application (block 410). For example, the RAV application may compare the received information associated with the third party application (e.g., and/or information associated with third party server 220) with information associated with third party applications (e.g., and/or information associated with third party server 220) stored in a memory (e.g., a memory associated with IDM server 250).

In one example, the RAV application may determine that the received information associated with the third party application does not match any of the stored information associated with the third party applications. The RAV application may, based on the determination, deny registration to the device application.

As further shown in FIG. 4, process 400 may include authenticating user device 210 based on information associated with user device 210 (block 415). For example, the RAV application may determine that the received information associated with the third party application matches the stored information associated with the third party application. Based on the determination, the RAV application may authenticate the user device 210 based on the information associated with user device 210 and/or the information associated with the user obtained from the token. For example, the RAV application may compare the information associated with user device 210 and/or the user, obtained from the token, to information associated with user devices 210 and/or users, respectively, stored in the memory.

In one example, the RAV application may determine that the information associated with user device 210 and/or the information associated with the user, obtained from the token, does not match the stored information associated with user devices 210 and/or the stored information associated with the user, respectively. Based on the determination, the RAV application may not register the device application. In another example implementation, the RAV application may send a query to user device 210 to obtain additional information with which to authenticate user device 210, such as identity information associated with the user (e.g., address information, a name, a telephone number, an email address, etc.). The RAV application may use the additional information to perform an identity management operation on user device 210 that includes querying IDM server 250 to authenticate user device 210.

As yet further shown in FIG. 4, process 400 may include verifying that the device application is a trusted device application (block 420). For example, the RAV application may determine that the information associated with user device 210 and/or the information associated with the user, obtained from the token, matches the stored information associated with user device 210 and/or the stored information associated with the user, respectively. Based on the determination, the RAV application may use the identifier associated with the device application, obtained from the token, to verify that the device application is a trusted application and/or originates from a trusted vendor.

For example, the RAV application may compare the identifier, associated with the device application, to a list of identifiers (e.g., stored in a memory) corresponding to trusted applications, to determine whether the identifier associated with the device application matches any of the identifiers stored in the memory. In another example, the RAV application may compare a vendor identifier associated with the device application to a list of vendor identifiers (e.g., stored in the memory) that correspond to trusted vendors, to determine whether the vendor identifier associated with the device application matches any of the vendor identifiers stored in the memory.

In one example, if the RAV application determines that the identifier, associated with the device application, does not match any of the identifiers stored in the memory, then the RAV application may deny registration to the device application. If, however, the RAV application determines that the identifier, associated with the device application, matches an identifier stored in the memory, then the RAV application may determine that the device application is a trusted application.

In another example, implementation the RAV application may send the identifier associated with the device application to another server device that permits access to a website and/or a service that specializes in verifying whether device applications are trusted applications (e.g., such as Verisign®, Symantec, etc.) based on application identifiers, application signatures, application names, vendor identifiers, etc.). In one example, the service that specializes in verifying a device application may certify the device application as a trusted application and/or associate an application signature to the device application that indicates that the device application is a trusted application. The RAV application may, for example, determine that the device application is a trusted application based on a notification, received from the other server device, indicating that the device application is verified.

As shown in FIG. 4, process 400 may include generating an integrity code for the trusted application (block 425). For example, based on the determination that the device application is a trusted application, the RAV application may use a data integrity algorithm, such as a hash algorithm, a cryptographic algorithm, a checksum algorithm, and/or some other mathematical algorithm to generate an integrity code based on the credentials received from the token (e.g., information associated with user device 210, the information associated with the user, and/or the identifier associated with device application). The integrity code may be used by the RAV application to verify the user, user device 210, and/or the device application at a later point in time.

In another example implementation, context information associated with user device 210 may be obtained. For example, the RAV application may send, to user device 210, a query to obtain context information associated with user device 210 that may include a network address (e.g., an IP address, a MAC address, an MDN, a URL, etc.), location information, capabilities information (e.g., a type of user device 210, etc.), network access information (e.g., an APN, PDN, an identifier associated with service gateway server 240 via which user device 210 is communicating with service provider network 260, port information, etc.), etc. In one example implementation, the RAV application may receive the context information and may store the context information in a memory associated with IDM server 250. In another example implementation, the RAV application may receive the context information and may, in a manner similar to that described above, use a data integrity algorithm to generate an integrity code based on the context information. The RAV application may, for example, use the integrity code, at the later point in time, to identify changes in the context information, which may indicate whether an imposter user device 210, another user, and/or an imposter device application is attempting to receive services using registration credentials associated with the device application.

In yet another example implementation, the RAV application may use the data integrity algorithm to generate an integrity code based on the credentials received from the token and/or the context information obtained from user device 210.

As further shown in FIG. 4, process 400 may include storing registration information associated with the trusted application and sending a registration notification (block 430). For example, the RAV application may register the device application and may generate a unique identifier that indicates that the device application is registered (e.g., a registration number, a registration key, a registration tag, and/or other types of unique identifiers). The description to follow will generally refer to the unique identifier as a registration number. The description is not limited, however, to a registration number and may equally apply to other types of unique identifiers that indicate that the device application is registered.

Additionally, or alternatively, the RAV application may store registration information in a device application data structure (e.g., device application data structure 500 of FIG. 5) within a memory associated with IDM server 250. In one example, the RAV application may store, as registration information, the data integrity code (e.g., based on the credentials), the context information associated with user device 210, and/or the registration number. In another example, the RAV application may store, as registration information, the data integrity code (e.g., based on the credentials and/or the context information) and/or the registration code. In yet another example, the RAV application may store, as registration information, the credentials, the context information, the integrity code, and/or the registration number.

The RAV application may send a registration notification (e.g., that includes the registration number) to the third party application confirming the registration of the device application. In another example implementation, the RAV application may generate a token that may be sent to the device application for use when obtaining services via the third party application. The token may include the registration number and/or other information that the RAV application may use to verify the device application at a future point in time. In another example, the token may include a time-to-live (TTL) value that identifies a period of time during which the device application may use the token to obtain services. After expiration of the TTL value, the device application may be reregistered in a manner similar to that described above.

In another example implementation, the context information may be updated by the RAV application based on usage patterns associated with sessions with the device application over time. In one example, location information, stored as a result of the registration operation, may be updated by the RAV application if location information, obtained from user device 210 during future sessions with the device application, is different than the location information stored as the result of the registration operation. In another example, usage patterns associated with a time of day and/or days of the week that the device application requests services, may be updated by the RAV application based on user habits during future sessions. The RAV application may update context information and may, for example, recalculate an integrity code associated with the updated context information.

FIG. 5 is a diagram of an example device application data structure 500 (hereinafter referred to as "data structure 500"). As illustrated in FIG. 5, data structure 500 may include a collection of fields, such as a device identifier field 502, an application identifier field 504, a username field 506, a password field 508, a personal identification number field 510, a location field 512, an other context field 514, a network access point field 516, an integrity code field 518, and/or a registration number field 520. Data structure 500, of FIG. 5, includes fields 502-520 for explanatory purposes. In practice, data structure 500, of FIG. 5, may include additional fields, fewer fields, different fields, and/or differently arranged fields than are described with respect to data structure 500 of FIG. 5. For example, data structure 500 may include one or more of an address field, a name field, a third party application identifier field, and OpenID® field, an OAuth field, etc.

Device identifier field 502 may store a device identifier associated with a particular user device 210, that hosts a device application, such as a cellular telephone, a wireless mobile telephone, a PDA, a lap top computer, a STB, a smart grid device (e.g., a programmable thermostat, a programmable heating, ventilation, and air conditioning system), a medical device (e.g., device that monitors a patient's heart rate, etc.), a building security system, etc. Application identifier field 504 may store an identifier (e.g., an application identifier, an application signature, a vendor identifier, etc.) associated with the device application hosted by the particular user device 210. Username field 506 may store a username associated with a user of the particular user device 210. Password field 508 may store a password associated with the user of the particular user device 210. Personal identification number field 510 may store a PIN associated with the user of the particular user device 210. In one example, IDM server 250 may receive credentials from a device application, hosted by a particular user device 210, during a registration operation and the RAV application may store the credentials (e.g., in fields 502-510 of data structure 500) in a manner similar to that described above (e.g., with respect to block 430 of FIG. 4).

Location field 512 may store location information (e.g., location coordinates, elevation information, latitude and/or longitude, cell sector information, velocity information, etc.), associated with the particular user device 210. For example, the RAV application may obtain location information associated with the particular user device 210 (e.g., via a query to the particular user device 210 to obtain context information) during a registration operation or some other operation and may store the location information in location field 512. Other context information field 514 may store context information associated with the particular user device 210 and/or the user, such as usage habits associated with the user (e.g., a time of day, particular days of the week, a quantity of times per day, etc.), device capabilities associated with user device 210 (e.g. a type of user device 210, such as wireless mobile telephone, a PDA, etc.), an application identifier (e.g., associated with an application hosted by used by user device 210, etc.). For example, the RAV application may store other context information in other context field 514 obtained as a result of the query (e.g., to obtain context information) performed during a registration operation and/or as a result of prior sessions associated with the device application hosted by the particular user device 210.

Network access point field 516 may store information associated with a network connection with the particular user device 210. For example, IDM server 250 and/or service gateway server 240 may identify network connection information associated with a manner in which the device application, hosted by the particular user device 210, communicates with service provider network 260 during a registration session and/or while providing services to the device application. The network connection information may, for example, include a particular gateway server, a port on the particular gateway server via which the device application communicates, an APN, a PDN, and/or other network connection information. The RAV application may, for example, store the network connection information in network access point field 516.

Integrity code field 518 may store an integrity code generated by the RAV application using a data integrity algorithm (e.g., a hash algorithm, a cryptographic algorithm, a checksum algorithm, and/or some other mathematical algorithm). For example, the RAV application may use the data integrity algorithm to generate the data integrity code based on the credentials (e.g., stored in fields 502-510) received from the device application during the registration operation. In another example, the RAV application may use the data integrity algorithm to generate the data integrity code based on the credentials (e.g., stored in fields 502-510) and/or context information (e.g., stored in fields 512-516) obtained as a result of a query to the particular user device 210 during the registration operation. The RAV application may store the generated integrity code in integrity code field 518. Registration number field 520 may store the registration number generated by the RAV application to confirm that the device application was registered by the RAV application.

As shown in FIG. 5, IDM server 250 may receive the credentials from the device application (e.g., hosted by user device 210) during a registration operation and the RAV application may, in a manner similar to that described above (e.g., with respect to block 430 of FIG. 4), store the credentials in data structure 500. For example, as shown by ellipse 522 of FIG. 5, the RAV application may store information associated with user device 210 that may be a wireless mobile telephone with a particular device identifier (e.g., IMSI, MSISDN, MDN, etc.). The RAV application may, for example, store information associated with a device application (e.g., a device identifier, such as application 1, as shown by ellipse 522) that is hosted by user device 210. Additionally, or alternatively, the RAV application may, for example, store information associated with the user of user device 210, obtained from the credentials, such as a username (e.g., rjones), a password (e.g., orange), a personal identification number (e.g., 1234), etc. (e.g., shown by ellipse 522).

As further shown by FIG. 5, IDM server 250 may receive context information as a result of a query sent to user device 210 during a registration operation and the RAV application may, in a manner similar to that described above (e.g., with respect to block 430 of FIG. 4), store the context information in data structure 500. For example, the RAV application may obtain location information (e.g., locations A, B as shown by ellipse 522 of FIG. 5) associated with user device 210 and may store the location information in data structure 500. In another example, the RAV application may obtain other context information associated with user device 210 (e.g., device capabilities, as shown by ellipse 522), such as a type and/or configuration of user device 210, and may store the other context information in data structure 500. In yet another example, the RAV application may identify network connection information (e.g., APN 1, PDN 1, as shown by ellipse 522) and may store the network connection information in data structure 500.

As yet further shown by FIG. 5, the RAV application may generate an integrity code based on information stored in data structure 500. For example, the RAV application may use a data integrity algorithm to generate a data integrity code (e.g., 369782, as shown by ellipse 522) based on all or a portion of the information associated with the registration or operation of the device application hosted by user device 210. Additionally, or alternatively, the RAV application may register the device application and may generate a registration number (e.g., 132435, as shown by ellipse 522) and may store the registration number in data structure 500.

The RAV application may store information associated with the registration of other device applications hosted by other user devices 210, such as another wireless telephone device (e.g., shown as ellipse 524), a computer device (e.g., shown as ellipse 526), a set top box (e.g., shown as ellipse 528), and/or other user devices 210.

Figure 6:
FIG. 6 is a flowchart of an example process for verifying and authorizing a user device-hosted application in response to a query from a user device.

FIG. 6 is a flowchart of an example process 600 for verifying and/or authorizing a device application in response to a query from user device 210. In one implementation, process 600 may be performed by IDM server 250. In another implementation, some or all of process 600 may be performed by a device or collection of devices separate from, or in combination with, IDM server 250. For example, service gateway server 240 and/or IDM server 250 could be combined into a single device that performs process 600.

As shown in FIG. 6, process 600 may include receiving, from user device 210, a request to verify a device application (block 605). For example, a user of user device 210 may desire to download device application (e.g., or to activate a device application that is already downloaded) on user device 210 and may send a request, to IDM server 250, to verify the device application. IDM server 250 may receive the request that may include information associated with the device application (e.g., a device application name, information associated with a vendor from which the device application originates, a device application identifier, etc.).

In another example, the user may desire to verify a third party application with which the user desires to perform a transaction using a device application hosted on user device 210. For example, the user may desire to electronically purchase goods and/or services from a third party application (e.g., hosted by third party server 220) by providing payment information (e.g., credit card information, etc.) via the device application. In another example, the user may desire to share and/or authorize the exchange of medical records and/or other confidential information with a third party application and may query IDM server 250 to verify that the third party application is a trusted application.

In yet another example, user device 210 may initiate a verification of a device application that is configured to automatically download software updates, patches, etc. In this example, user device 210 may determine that a device application is attempting to download software updates and user device 210 may automatically send a request to IDM server 250 to verify that the device application is a trusted application. The request may include information associated with the device application (e.g., an application identifier, a device application name, vendor information from which the device application originates, etc.).

As also shown in FIG. 6, process 600 may include performing a lookup operation to determine whether the device application can be verified (block 610). For example, the RAV application may use the information associated with the device application to determine whether the device application is a trusted application. The RAV application may, for example, perform a look up operation to determine whether the information associated with the device application, received in the request, matches information associated with trusted applications stored in a memory associated with IDM server 250. In one example, the RAV application may determine that the information associated with the device application matches information associated with a trusted application and/or information associated with a trusted vendor from which the device application originates. Based on the determination, the RAV application may verify the device application as a trusted application. If however, the RAV application determines that the information associated with the device application does not match the information associated with the trusted applications stored in the memory, then the RAV application may not verify the device application as trustworthy.

In another example implementation, the RAV application may send the identifier associated with the device application to another server device that permits access to a website and/or a service (e.g., Verisign®, Symantec®, Entrust®, etc.) and that specializes in verifying, signing, and/or certifying device applications, third party applications, websites, etc. The RAV application may, for example, determine that the device application is a trusted application based on a notification, received from the other server device, indicating that the device application is verified. If, however, the RAV application receives a notification from the server device indicating that the device application cannot be verified, then the RAV application may, for example, determine that the device application is not a trusted application.

As further shown in FIG. 6, process 600 may include sending a notification regarding whether the device application is a trusted application (block 615). For example, if the RAV application determines that the device application is a trusted application, then the RAV application may send a notification to user device 210 that the device application is a trusted application, can be downloaded (e.g., and/or activated), and/or can be registered with the RAV application (as described above with respect to FIG. 4). In another example, if the RAV application determines that the device application is not a trusted application, then the RAV application may send a notification to user device 210 that the device application is not a trusted application, should not be downloaded, and/or cannot be registered.

Figure 7:
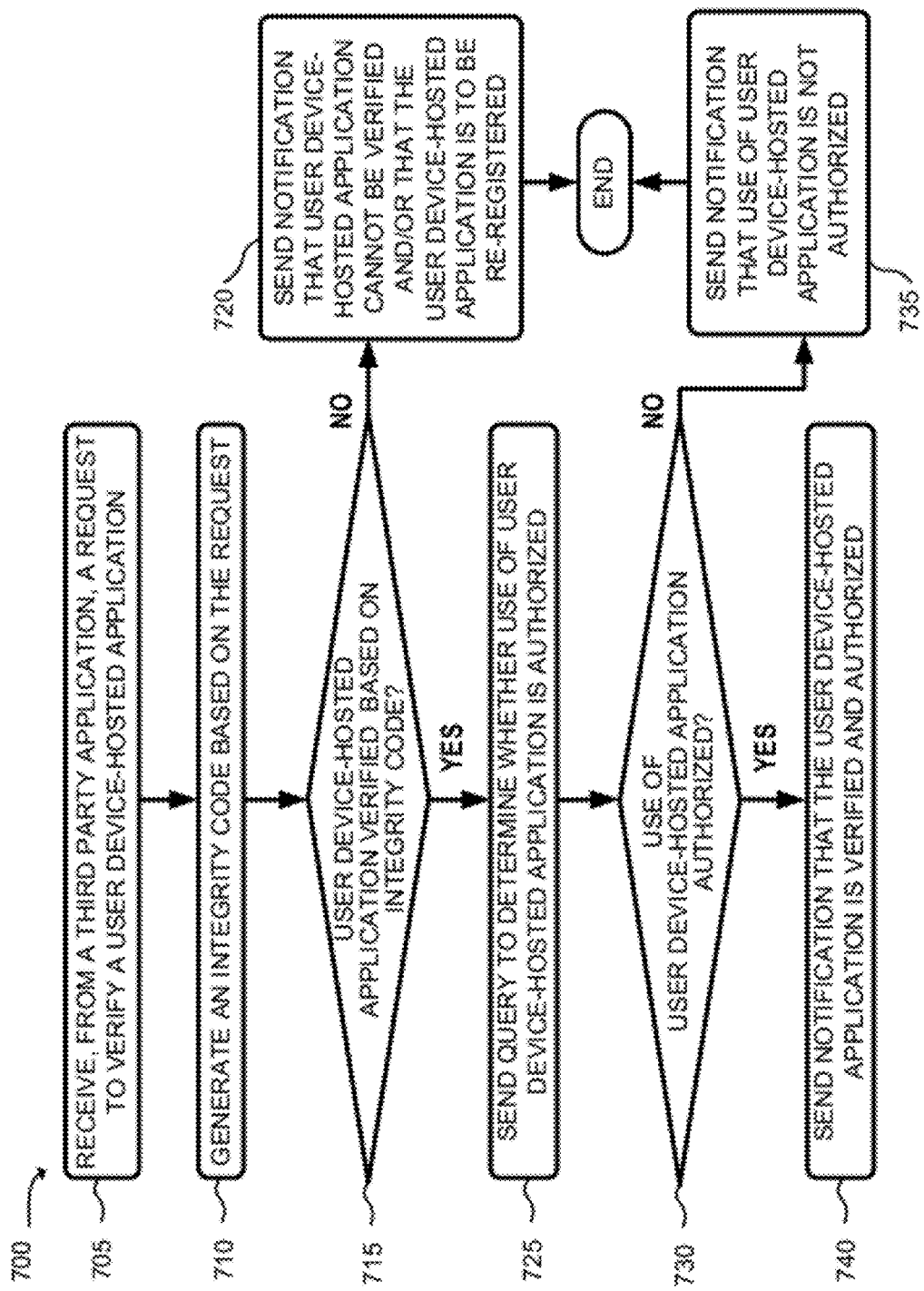
FIG. 7 is a flowchart of an example process for verifying and authorizing a user device-hosted application in response to a query from a third party application.

FIG. 7 is a flowchart of an example process 700 for verifying and/or authorizing a user device-hosted application in response to a query from a third party application. In one example implementation, process 700 may be performed by IDM server 250. In another example implementation, some or all of process 700 may be performed by a device or collection of devices separate from, or in combination with, IDM server 250. For example, service gateway server 240 and/or IDM server 250 could be combined into a single device that performs process 700.

As shown in FIG. 7, process 700 may include receiving, from a third party application, a request to verify a device application (block 705). For example, a third party application, hosted by third party server 220, may receive a request for services from a device application hosted by user device 210. In one example, the request may include a token that contains credentials, such as information associated with the device application (e.g., an application identifier), information associated with a user device 210 (e.g., a device identifier), and/or information associated with a user of user device 210 (e.g., username, password, PIN, etc.). In another example, the token may include a TTL associated with a period of time after which the device application is to be re-registered. The third party application may receive the request and may forward the token to IDM server 250 to verify the device application. IDM server 250 may receive the request and may perform an operation to verify and/or authorize the device application.

In another example, service provider network 260 may receive a request for services from the device application (e.g., via service gateway server 240 using an HTTP protocol) and the service provider network 260 may initiate a verification of the device application in response to the request. For example, service gateway server 240 may query IDM server 250 to verify the device application based on credentials contained in the token. Additionally, or alternatively, service gateway server 240 may identify context information associated with user device 210, such as location information, network connection information (e.g., a gateway identifier, a port associated with the gateway, an APN and/or PDN used by user device 210, etc.), and/or other context information, and may include the context information in the query.

As also shown in FIG. 7, process 700 may include generating an integrity code based on the request (block 710). For example, the RAV application may use the credentials obtained in the token to generate an integrity code using a data integrity algorithm (e.g., using a hash algorithm, a cryptographic algorithm, a checksum, and/or another mathematical algorithm). In another example implementation, the RAV application may generate the integrity code based on the credentials and context information associated with user device 210. For example, the RAV application may obtain context information from service gateway server 240 and/or by generating a query to obtain the context information from user device 210.

In the case, described above, where service provider network 260 (e.g., service gateway server 240) initiates verification of the device application, the RAV application may, for example, use the data integrity algorithm to generate the integrity code based on the credentials from the request for services, received from the device application and/or the identified context information associated with user device 210.

In another example implementation, the RAV application may verify the device application without generating an integrity code. For example, the RAV application may use the credentials obtained from the token, the context information associated with user device 210, and/or other information as a basis to verify the device application.

As further shown in FIG. 7, if the device application is not verified based on the integrity code (block 715—NO), then process 700 may include sending a notification that the device application cannot be verified and/or an instruction that the device application is to be re-registered (block 720). For example, the RAV application may retrieve an integrity code associated with user device 210 and/or the device application from a device application data structure (e.g., data structure 500 of FIG. 5) that was stored by the RAV application at a prior point in time (e.g., as a result of a registration operation). The RAV application may compare the generated integrity code to an integrity code stored in the device application data structure.

In one example implementation, the RAV application may determine that an integrity code, generated based on the credentials, does not match a stored integrity code. Based on the determination, the RAV application may send a notification to the third party application indicating that the device application could not be verified and/or is to be re-registered. In this example, the determination that the generated integrity code does not match the stored integrity code may indicate that the user is using a different user device 210 to host the device application. In another example, the determination that the generated integrity code does not match the stored integrity code may indicate that the credentials associated with the device application, user device 210, and/or the user are being used by another user device 210 (e.g., an imposter device) that is attempting to receive unauthorized services using the credentials. The RAV application may deny access to services and/or send an instruction to the other user device 210 to register the device application with the RAV application to prevent the unauthorized use of the device application and/or credentials.

In another example implementation, the RAV application may determine that an integrity code, generated based on the credentials and the context information, does not match a stored integrity code based on the credentials and the context information. Based on the determination, the RAV application may send a notification to the third party application indicating that the device application could not be verified and/or is to be re-registered.

In yet another example implementation, the RAV application may determine that an integrity code, generated based on the credentials, matches a stored integrity code. Based on the determination, the RAV application may compare context information (e.g., received as a result of a query to user device 210 and/or identified as a result of a request for services from the device application) to context information stored in the device application data structure (e.g., as a result of prior sessions and/or a prior registration operation). Based on the determination that the received and/or identified context information does not match the stored context information, the RAV application may send a notification to the third party application indicating that the device application could not be verified and/or is to be re-registered. In one example, the RAV application may determine, based on a comparison of the location information, that the request for services originated from user device 210 at an unexpected location (e.g., a location that does not match the location stored in the device application data structure and/or a location identified based on prior sessions). In another example, the RAV application may determine that user device 210 was accessing service provider network 260 via a network connection that does not match the network connection stored in the device application data structure.

In another example implementation, the RAV application may determine that a TTL, contained with a token received from the device application, has expired. Based on the determination that the TTL has expired, the RAV application may send a notification that the device application cannot be verified and/or may instruct the third party application and/or user device 210 to re-register the device application.

In yet another example implementation, the RAV application may determine that the device application cannot be verified without generating an integrity code. For example, the RAV application may compare credentials (e.g., obtained from the token) and/or context information (e.g., obtained from the request or via a query to user device 210) with stored credentials and/or context information, respectively (e.g., stored in data structure 500 of FIG. 5). Based on the comparison, the RAV application may, for example, determine that the device application cannot be verified when the credentials and/or context information do not match the stored credentials and/or stored context information, respectively.

As yet further shown in FIG. 7, if the device application is verified based on the integrity code (block 715—YES), then process 700 may include sending a query to determine whether use of the device application is authorized (block 725). For example, the RAV application may determine that an integrity code, generated based on the credentials and the context information, matches a stored integrity code based on the credentials and the context information. Based on the determination that the generated integrity code matches the stored integrity code, the RAV application may determine that the device application is a trusted application. In another example, the RAV application may determine that an integrity code, generated based the credentials matches the stored integrity code based on the credentials. Based on the determination, the RAV application may compare context information (e.g., received as a result of a query to user device 210 and/or identified as a result of a request for services received from the device application) to context information stored in the device application data structure (e.g., data structure 500 of FIG. 5). The RAV application may, for example, determine that the device application is a trusted application when the context information matches the stored context information.

In another example implementation, the RAV application may verify the device application without generating an integrity code. For example, the RAV application may determine that the device application is a trusted application when the credentials and/or context information match the stored credentials and/or stored context information, respectively.

Based on the determination that the device application is a trusted application, the RAV application may generate the query to determine whether use of the device application is authorized, as described above. For example, the RAV application may retrieve (e.g., from a memory associated with IDM server 250) policy information, associated with service provider network 260, that identifies whether, under which conditions, and/or the manner in which access to the services is authorized. For example, the policy information may indicate that access to the services is authorized during certain times of day, days of the week, etc. In another example, the policy information may indicate that access to the services is authorized up to a particular quantity of times (e.g., based on a threshold) per unit of time (e.g., day, week, month, etc.). In yet another example, the policy information may identify additional verification steps to be undertaken if the requested services involve confidential information (e.g., medical records, personal information, such a social security number, credit card information, etc.). If, for example, additional verification steps are to be performed, the RAV application may query user device 210 to receive additional information and/or to perform other acts for the additional verification steps.

In another example, the RAV application may retrieve permission information from the memory that identifies whether, the conditions under, and/or the manner in which provisioning the services are authorized by a user of another user device 210 from which information is to be obtained by a service provider application hosted by application server 230. For example, in a manner similar to that described above, the permission information may indicate that access to the services is authorized during certain times of day, days of the week, etc. and/or up to a particular quantity of times (e.g., based on another threshold) per unit of time (e.g., day, week, month, etc.). In another example, the permission information may identify particular users of user devices 210 to which access is authorized.

In yet another example, the RAV application may retrieve, from the device application data structure, context information associated with a usage pattern identified from prior sessions (e.g., or specified as a user preference by the user during a registration operation) with the device application hosted by user device 210. For example, the RAV application may determine, from the information associated with the usage pattern, that the device application usually requests services during a particular period of day (e.g., business hours) and/or on certain days of the week (e.g., a work week, such as Monday through Friday). The RAV application may use the information associated with the usage pattern and/or user preference to determine whether use of the device application is authorized.

As still further shown in FIG. 7, if use of the device application is not authorized (block 730—NO), then process 700 may include sending a notification that use of the device application is not authorized (block 735). For example, RAV application may determine that use of the device application is not authorized based on policy information associated with the service provider network and/or the permission information. In one example, RAV application may determine that the time of the day (e.g., 2:00 am) and/or the day of the week (e.g., Sunday) is outside the time of day (e.g., business hours) and/or days of the week (e.g., the work week) specified by the policy information. In another example, the RAV application may determine that the quantity of times that the device application has requested services exceeds a particular threshold (e.g., a rate, a quota, and/or some other threshold) specified by the policy information. In yet another example, the RAV application may determine that the request for services from the device application does not conform to the usage pattern and/or user preferences stored in the device application data structure (e.g., data structure 500 of FIG. 5). In still another example, the RAV application may determine that the user, of user device 210, is not an authorized user as specified by the permission information.

Based on the determination that use of the device application to obtain services, is not authorized, the RAV application may deny access to services by the device application and/or may send a notification to the third party application and/or user device 210 indicating that the device application is not authorized to receive services.

As yet further shown in FIG. 7, if use of the device application is authorized (block 730—YES), then process 700 may include sending a notification that the device application is verified and authorized (block 740). For example, the RAV application may determine that use of the device application is authorized based on the permission information or the policy information associated with the service provider network. In one example, the RAV application may determine that the time of the day (e.g., 3:30 pm) and/or the day of the week (e.g., Tuesday) is within the time of day (e.g., business hours) and/or days of the week (e.g., the work week) specified by the policy information. In another example, the RAV application may determine that the quantity of times that the device application has requested services is less than a particular threshold specified by the policy information. In yet another example, the RAV application may determine that the request for services from the device application conforms to the usage pattern and/or user preferences stored in the device application data structure (e.g., data structure 500 of FIG. 5). In still another example, the RAV application may determine that the user, of user device 210, is an authorized user as indicated by the permission information.

Based on the determination that use of the device application to obtain services is authorized, the RAV application may grant access to services to the device application and/or may send a notification to the third party application and/or user device 210 indicating that the device application is verified and/or authorized to receive services.

In another example implementation, the RAV application may generate a token that the device application may use to access services via service provider network 260. The token may be sent to the device application (e.g., hosted by user device 210) via a separate communication channel than the request for services was received. The token may be sent, for example, using a short message service (SMS) protocol that permits the device application to access services at a future point in time. Issuance of the token may deny an imposter device application, hosted on an imposter user device 210, from obtaining unauthorized services using credentials obtained from user device 210.

In yet another example, the RAV application may retrieve identity information associated with the user of user device 210 that hosts the device application, which may include login credentials associated with a service provider application hosted by application server 230. The RAV application may send the identity information to user device 210 and/or third party server 220 that may enable the device application and/or the third party application, respectively, to access services from the service provider application.

Implementations described herein may include systems and/or methods that provide for application registration, authorization and verification of a device application. In one example implementation, the RAV application may perform an operation to identify and/or register a device application. For example, the RAV application may obtain credentials associated with the device application and/or context information associated with a user device on which the device application is hosted and may use the credentials to register the device application. In another example implementation, the RAV application may provide authorization and/or verification services for a user device, a service provider network, and/or a third party application (e.g., on behalf of a user of a user device) to authorize and/or to verify that a device application is a trusted application and/or to authorize the provision of services via the trusted application.

The application registration, authorization and verification implementation may protect a user device, a service provider network, and/or a third party application from acts performed by an imposter device application and/or imposter user device attempting to receive services using credentials associated with a trusted device application, a user device on which the trusted device application is hosted, and/or a user of the user device. The application registration, authorization and verification implementation may also protect a user device, a service provider network, and/or a third party application from acts, performed by a device application that is not a trusted application, such as a cyber attack (e.g., unauthorized penetration of a user device and/or network, a denial of service attack, etc.), introducing a virus, a worm, etc. into a network, an unauthorized disclosure of user information and/or network content, etc.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4, 6 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor that executes software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
    storing, in a memory associated with the server device, registration information associated with a device application hosted by a user device, the registration information including context information associated with the user device and a first integrity code generated at a prior point in time as a result of a registration operation associated with the device application;

receiving, by the server device and from the device application, a request to receive a service, where the request includes at least two of: information associated with a user of the user device, information associated with the user device, and information associated with the device application;

generating, by the server device and using a data integrity algorithm, a second integrity code based on at least one of the information associated with the user of the user device, the information associated with the user device, and the information associated with the device application;

comparing, by the server device, the second integrity code with the first integrity code stored in the memory;

retrieving, from the memory, the context information associated with the user device when the second integrity code matches the first integrity code, where the context information includes location information, associated with the user device, at the prior point in time;

comparing, by the server device, the location information, at the prior point in time, to location information, associated with the user device, at a current point in time; and sending, to the device application, a notification that services may be received when the location information, at the prior point in time, matches the location information at the current point in time, wherein storing the registration information includes:

receiving, from the user device, a registration request that includes the information associated with the user device, the information associated with the user, and the information associated with the device application, wherein the information associated with the device application includes an identifier associated with the device application, comparing the identifier associated with the device application with identifiers associated with a plurality of trusted applications stored in the memory, wherein, when the identifier, associated with the device application, matches at least one identifier of the identifiers associated with the plurality of trusted applications:

generating, based on at least one of the information associated with the device application, the information associated with the user device, and the information associated with the user, the first integrity code using the data integrity algorithm.

2. The method of claim 1, where the data integrity algorithm is a hash algorithm or a cryptographic algorithm.

3. The method of claim 1, where storing the registration information further includes:

sending, to a further server device, the identifier associated with the device application, where the further server device provides a service that verifies device applications;

receiving, from the further server device, a notification that the device application has been verified; and wherein generating the first integrity code comprises:

generating the first integrity code in response to the notification that the device application has been verified.

4. The method of claim 1, where before sending the notification that services may be received, the method further comprises:

retrieving, from the memory, policy information, associated with the server device, that indicates a manner in which the services are to be provided to the device application; and authorizing the device application to receive the services based on a determination that the services are to be sent in the manner indicated by the policy information.

5. The method of claim 1, where comparing the location information at the prior point in time with location information at a current point in time includes:

querying the user device to obtain other context information associated with the user device, where the other context information includes the location information at the current point in time.

6. The method of claim 1, where the registration information includes a time-to-live (TTL) value that includes a time after which the device application is to be re-registered, the method further comprising:

determining that the device application is not to be re-registered when a time at which the request is received is prior to the time after which the device application is to be re-registered.

7. The method of claim 1, further comprising:

receiving, from another device application hosted by another user device, a request to receive the service, the request including at least one of information associated with a user of the other user device, information associated with the other user device, and information associated with the other device application;

generating, using the data integrity algorithm, a third integrity code based on the at least one of the information associated with the user of the other user device, the information associated with the other user device, and the information associated with the other device application; and sending a notification to the other device application that access to the service is denied based on a determination that the third integrity code does not match a fourth integrity code generated at a previous point in time as a result of a registration operation associated with the other device application.

8. A server device comprising:

a memory to store instructions; and a processor to execute the instructions to:

store, in the memory, registration information associated with a device application hosted by a user device, the registration information including context information associated with the user device and a first integrity code generated at a prior point in time as a result of a registration operation associated with the device application;

receive, from the device application, a request to receive a service, wherein the request includes at least two of: information associated with a user of the user device, information associated with the user device, and information associated with the device application;

generate, by the server device and using a data integrity algorithm, a second integrity code based on at least one of the information associated with the user of the user device, the information associated with the user device, and the information associated with the device application;

compare the second integrity code with the first integrity code stored in the memory;

retrieve, from the memory, the context information associated with the user device when the second integrity code matches the first integrity code, wherein the context information includes location information, associated with the user device, at the prior point in time;

compare the location information, associated with the user device, at the prior point in time, to location information, associated with the user device, at a current point in time; and send, to the device application, a notification that services may be received when the location information, at the prior point in time, matches the location information at the current point in time, wherein, when storing the registration information, the processor to further execute the instructions to:

receive from the user device, a registration request that includes the information associated with the user device, the information associated with the user, and the information associated with the device application, wherein the information associated with the device application includes an identifier associated with the device application, send, to another server device, the identifier associated with the device application, wherein the other server device provides a service that verifies device applications, receive, from the other server device, a notification that the device application has been verified, and in response to the notification that the device application has been verified:

generate, based on at least one of the information associated with the device application, the information associated with the user device, and the information associated with the user, the first integrity code using the data integrity algorithm.

9. The server device of claim 8, wherein the data integrity algorithm is a hash algorithm or a cryptographic algorithm.

10. The server device of claim 8, wherein, when storing the registration information, the processor to further execute the instructions to:

compare the identifier associated with the device application with identifiers associated with a plurality of trusted applications stored in the memory; and generate the first integrity code, using the data integrity algorithm, when the identifier, associated with the device application, matches at least one identifier of the identifiers associated with the plurality of trusted applications.

11. The server device of claim 8, wherein, before sending the notification that services may be received, the processor to further execute the instructions to:

retrieve, from the memory, policy information that indicates a manner in which the services are to be provided to the device application; and authorize the device application to receive the services based on a determination that the services are to be sent in the manner indicated by the policy information.

12. The server device of claim 8, wherein, when comparing the location information at the prior point in time with location information at a current point in time, the processor to further execute the instructions to:

query the user device to obtain other context information associated with the user device, wherein the other context information includes the location information at the current point in time.

13. The server device of claim 8, wherein the registration information includes a time-to-live (TTL) value that includes a time after which the device application is to be re-registered, the processor to further execute the instructions to:

determine that the device application is not to be re-registered when a time at which the request is received is prior to the time after which the device application is to be re-registered.

14. The server device of claim 8, the processor to further execute the instructions to:

receive, from another device application hosted by another user device, a request to receive the service, the request including at least one of information associated with a user of the other user device, information associated with the other user device, and information associated with the other device application;

generate, using the data integrity algorithm, a third integrity code based on the at least one of the information associated with the user of the other user device, the information associated with the other user device, and the information associated with the other device application; and send a notification to the other device application that access to the service is denied based on a determination that the third integrity code does not match a fourth integrity code generated at a previous point in time as a result of a registration operation associated with the other device application.

15. A non-transitory computer-readable storage medium storing instructions executable by at least one processing system of a server device, the instructions comprising instructions to:

store, in a memory associated with the server device, registration information associated with a device application hosted by a user device, the registration information including context information associated with the user device and a first integrity code generated at a prior point in time as a result of a registration operation associated with the device application;

receive, from the device application, a request to receive a service, wherein the request includes at least two of: information associated with a user of the user device, information associated with the user device, and information associated with the device application;

generate, using a data integrity algorithm, a second integrity code based on at least one of the information associated with the user of the user device, the information associated with the user device, and the information associated with the device application;

compare the second integrity code with the first integrity code stored in the memory;

retrieve, from the memory, the context information associated with the user device when the second integrity code matches the first integrity code, wherein the context information includes location information, associated with the user device, at the prior point in time;

compare the location information, at the prior point in time, to location information, associated with the user device, at a current point in time;

send, to the device application, a notification that services may be received when the location information, at the prior point in time, matches the location information at the current point in time;

receive, from another device application hosted by another user device, a request to receive the service, the request including at least one of information associated with a user of the other user device, information associated with the other user device, and information associated with the other device application;

generate, using the data integrity algorithm, a third integrity code based on the at least one of the information associated with the user of the other user device, the information associated with the other user device, and the information associated with the other device application; and send a notification to the other device application that access to the service is denied based on a determination that the third integrity code does not match a fourth integrity code generated at a previous point in time as a result of a registration operation associated with the other device application, wherein, when storing the registration information, the instructions further comprise instructions to:

receive, from the user device, a registration request that includes the information associated with the user device, the information associated with the user, and the information associated with the device application, wherein the information associated with the device application includes an identifier associated with the device application;

compare the identifier associated with the device application with identifiers associated with a plurality of trusted applications stored in the memory; and generate the first integrity code, using the data integrity algorithm, when the identifier, associated with the device application, matches at least one identifier of the identifiers associated with the plurality of trusted applications, wherein the first integrity code is based on at least one of the information associated with the device application, the information associated with the user device and the information associated with the user.

16. The non-transitory computer-readable medium of claim 15, wherein the data integrity algorithm is a hash algorithm or a cryptographic algorithm.

17. The non-transitory computer-readable medium of claim 15, wherein, before sending the notification that services may be received, the instructions to execute further comprise instructions to:

retrieve, from the memory, policy information, associated with the server device, that indicates a manner in which the services are to be provided to the device application; and authorize the device application to receive the services based on a determination that the services are to be sent in the manner indicated by the policy information.

18. The non-transitory computer-readable medium of claim 15, wherein, when comparing the location information at the prior point in time with location information at a current point in time, the instructions to execute further comprise instructions to:

query the user device to obtain other context information associated with the user device, wherein the other context information includes the location information at the current point in time.

19. The non-transitory computer-readable medium of claim 15, wherein the registration information includes a time-to-live (TTL) value that includes a time after which the device application is to be re-registered, the instructions to execute further comprise instructions to:

determine that the device application is not to be re-registered when a time at which the request is received is prior to the time after which the device application is to be re-registered.

20. The non-transitory computer-readable medium of claim 15, wherein, when storing the registration information, the instructions to execute further comprise instructions to:

send, to a further server device, the identifier associated with the device application, wherein the further server device provides a service that verifies device applications;

receive, from the further server device, a notification that the device application has been verified; and generate the first integrity code, in response to the notification that the device application has been verified.

* * * * *